United States Patent [19]

Wiese

[11] Patent Number: 5,372,039
[45] Date of Patent: Dec. 13, 1994

[54] APPARATUS AND METHOD FOR DETERMINING GEOSTROPHIC WIND VELOCITY

[75] Inventor: Chuck F. Wiese, Portland, Oreg.
[73] Assignee: Weatherwise, Inc., Portland, Oreg.
[21] Appl. No.: 109,648
[22] Filed: Aug. 20, 1993
[51] Int. Cl.$^5$ ............................................. G01N 1/00
[52] U.S. Cl. ................................. 73/170.16; 364/420
[58] Field of Search ........... 73/170.11, 170.16, 178 R, 73/178 T; 364/420, 551.01; 434/118, 113, 307, 365; 340/968, 949

[56] References Cited

U.S. PATENT DOCUMENTS

| | | | |
|---|---|---|---|
| 4,043,194 | 8/1977 | Tanner | 73/178 T |
| 4,163,216 | 7/1979 | Arpino | 340/949 X |
| 4,218,755 | 8/1980 | Root | 73/170.16 X |
| 4,287,762 | 9/1981 | Baer | 73/170.11 X |
| 4,522,070 | 6/1985 | Hagen | 73/384 |
| 4,631,960 | 12/1986 | Wögerbauer | 73/384 |
| 4,684,951 | 8/1987 | Baumer | 342/362 |
| 4,712,108 | 12/1987 | Schwab | 342/26 |
| 4,773,015 | 9/1988 | Leland et al. | 364/427 |
| 4,817,039 | 3/1989 | Frost | 364/420 |
| 4,980,833 | 12/1990 | Milligan et al. | 364/427 |
| 5,038,607 | 8/1991 | Baer et al. | 73/170.11 |
| 5,051,910 | 9/1991 | Liden | 364/446 |
| 5,105,191 | 4/1992 | Keedy | 73/170.11 X |
| 5,117,359 | 5/1992 | Eccles | 364/420 |
| 5,124,700 | 6/1992 | Bonafé | 340/959 |
| 5,130,712 | 7/1992 | Rubin et al. | 342/26 |
| 5,140,523 | 8/1992 | Frankel et al. | 364/420 |
| 5,155,375 | 10/1992 | Holley | 290/44 |
| 5,221,924 | 6/1993 | Wilson, Jr. | 73/170.11 X |

OTHER PUBLICATIONS

Hess, Seymour, "The Equations of Motion of a Rotating Earth," *Introduction to Theoretical Meteorology*, Chapter II (1959), pp. 161–178.

*Primary Examiner*—Herbert Goldstein
*Assistant Examiner*—Elizabeth L. Dougherty
*Attorney, Agent, or Firm*—Marger, Johnson, McCollom & Stolowitz

[57] ABSTRACT

A geostrophic wind forecasting method determines an atmospheric density (D) and a Coriolis parameter (F) at a given location. The atmospheric pressure is detected at the location over a predetermined period of time (t). The period of time (t), e.g., two hours, corresponds to the time required for a pressure surface to travel a distance (X) at an empirically determined velocity, e.g., 35 knots. The change in pressure ($\Delta P$) is detected over the period of time (t). The geostrophic wind velocity (VG) is then determined, according to the invention, based on the following relationship: $VG = [1/(D \times F)] \times [\Delta P / X]$. The resulting geostrophic wind velocity (VG) is then displayed. At 35 knots, over a given two hour period, the distance X traveled by the pressure surface is approximately equal to 129,640 meters. The method is embodied in an apparatus that can be associated with a conventional barometer to produce a weather forecasting station.

31 Claims, 5 Drawing Sheets

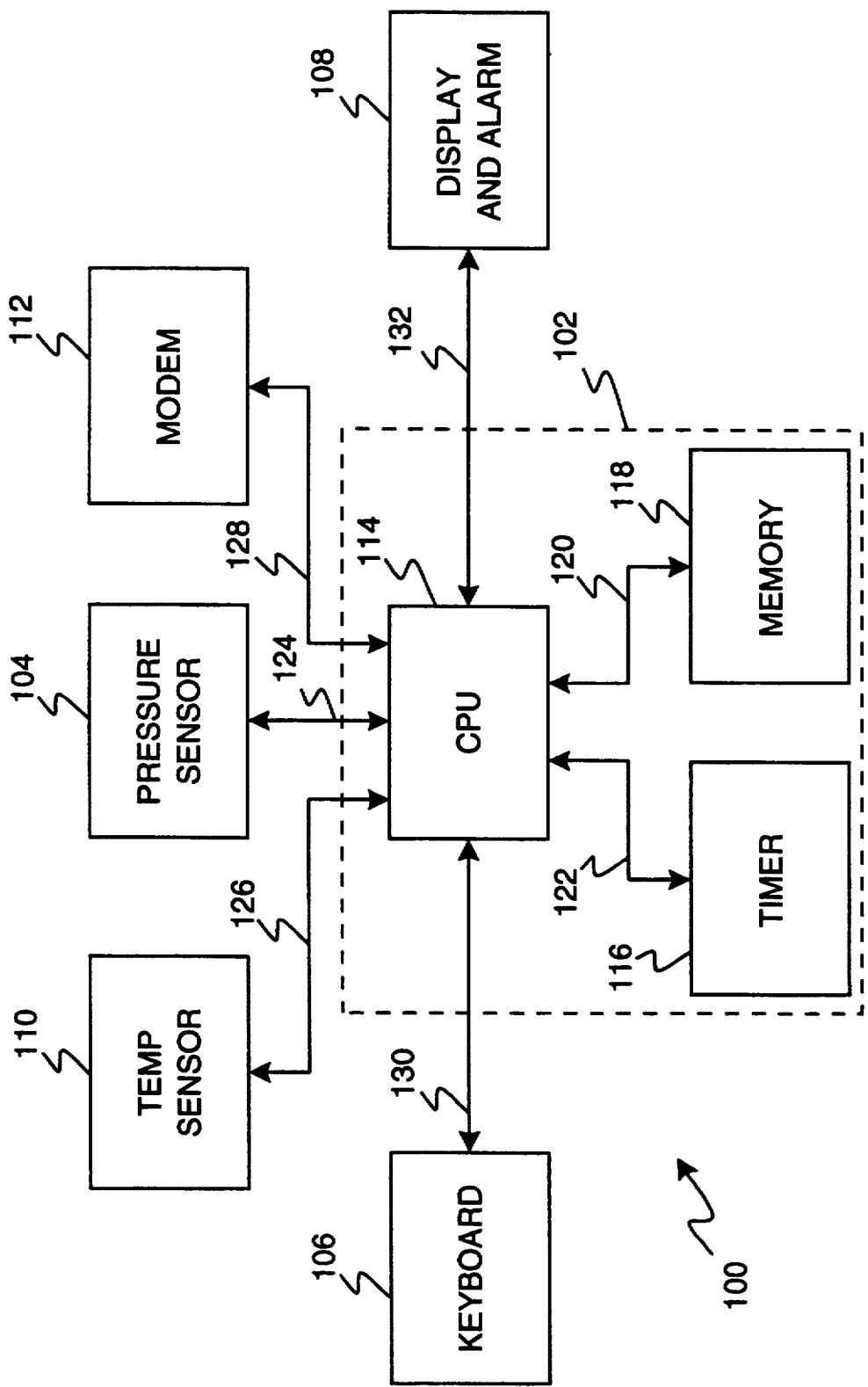

APPARATUS AND METHOD FOR DETERMINING GEOSTROPHIC WIND VELOCITY

BACKGROUND OF THE INVENTION

This invention relates generally to weather forecasting and more particularly to forecasting geostrophic wind velocity associated with wave cyclones.

Forecasting weather, in some cases, is an art. Many forecasting techniques have developed, however, to assist a meteorologist in accurately forecasting the weather. Some of the forecasting techniques are based on a theoretical model of the earth using a noninertial frame of reference. The noninertial frame of reference permits an analysis of a unit of mass being acted on by various forces to produce changes in the weather.

An analysis using the noninertial frame of reference leads to the well known geostrophic wind equations, as described in "Introduction to Theoretical Meteorology," by Seymour Hess (1959), pp. 161-178. The geostrophic wind equations relate the derivative of pressure P relative to distance x, i.e., $\delta P/\delta x$, to a resulting geostrophic wind velocity VG according to the following simplified equation:

$$VG=[1/(D \times F)] \times (\delta P/\delta x), \quad (1)$$

where D is equal to the atmospheric density and F is equal to the Coriolis parameter.

Meteorologists use the geostrophic wind equation to forecast the wind velocity associated with a particular pressure surface. In the simplest case, two pressure sensors separated by a known distance $\Delta x$ monitor the atmospheric pressure at their respective locations. The pressure detected at each location is then subtracted to produce a change in pressure $\Delta P$, which is an approximation of the actual derivative $\delta P/\delta x$. The change in pressure $\Delta P$ is then divided by the known distance $\Delta x$ between the sensors to produce the change in pressure over the change in distance, i.e., $\Delta P/\Delta x$, which is approximately equal to $\delta P/\delta x$.

The atmospheric density D is then computed according to the following known equation:

$$D=P/(R \times T), \quad (2)$$

where R is equal to the Universal Gas Constant and has a value of 287.05 J/(Kg×°K.); P is equal to the current pressure; and T is equal to the current temperature in degrees Kelvin. The Coriolis parameter can also be computed as a function of latitude according to the following known formula:

$$F=2 \times \Omega \times \sin(\phi), \quad (3)$$

where $\Omega$ is equal to the earth's angular velocity in radians per second; and $\phi$ is equal to the latitude of the pressure sensor location measured in degrees.

Once all of the variables of the geostrophic wind equation are known, the geostrophic wind velocity can be computed according to the geostrophic wind equation (1). The velocity produced by the geostrophic wind equation provides from three to twelve hours of advance warning depending on the geographic position of the sensors. On average, measurements performed in the Midwest United States, for example, produce approximately three hours of advance warning, whereas in the Western United States the advance warning is approximately twelve hours.

The above-described method requires a relatively high degree of understanding and mathematical ability. Although meteorologists possess this level of sophistication, the average consumer does not. In addition, the above-described method requires at least two pressure sensors as well as a means to communicate with both of the sensors. Meteorological services can provide the pressure readings at given locations; however, this method requires a means for down-loading the pressure data and means for converting the pressure readings to geostrophic wind velocity. As a result of the complexity of either technique, geostrophic wind forecasters are relegated to the offices of meteorologists, rather than the consuming public.

Another technique which requires only a single pressure sensor uses historical data to predict future wind velocity. U.S. Pat. No. 4,631,960 issued to Wögerbauer describes an electronic recording manometer having wind velocity prediction. The Wögerbauer apparatus senses change in pressure over time with the use of a pressure sensor under microprocessor control. Historical data relating change in pressure over time to wind velocity is stored in memory. Although little discussion is made of the historical data in Wögerbauer, presumably the historical wind velocity is an average wind velocity over a given period of time as measured at the current location of the apparatus. For each detected change in pressure over time, a corresponding historical wind velocity can then be fetched from memory and displayed on an LCD display.

The Wögerbauer apparatus suffers from several disadvantages. The first is the reduced accuracy of the wind velocity prediction. The accuracy of the historical data is limited by the length of the historical period over which the historical data is captured. Also, past wind patterns are not a perfect indicator of future wind patterns.

The second disadvantage of the Wögerbauer apparatus is its complexity. The historical wind velocity data is based on a particular geographical location. Thus, the historical wind velocity must be separately compiled for all geographical areas in which the apparatus operates. Therefore, either separate devices must be manufactured for different regions or the memory made large enough to store the historical data for all regions and allow the user to select the appropriate one. As a result of these and other disadvantages of the Wögerbauer apparatus, historical wind velocity forecasters are not widely in use by the public.

Accordingly, a need remains for a geostrophic wind forecasting apparatus which accurately and inexpensively forecasts geostrophic wind.

SUMMARY OF THE INVENTION

It is, therefore, an object of the invention to accurately predict geostrophic wind velocity.

The invention is a geostrophic wind forecasting method and apparatus. The method determines an atmospheric density (D) and a Coriolis parameter (F) at a given location. The atmospheric pressure is detected at the location over a predetermined period of time (t). The period of time (t) corresponds to the time required for a pressure surface associated with a wave cyclone to travel a distance (X) at a predetermined velocity. A negative change in pressure ($\Delta P$) is detected over the period of time (t). The geostrophic wind velocity (VG)

is then determined, according to the invention, based on the following relationship:

$$VG = [1/(D \times F)] \times [\Delta P/X].$$

The resulting geostrophic wind velocity (VG) is then recorded and displayed. The velocity VG will be updated subsequently each time a new VG exceeds the previous VG. This updating will continue as long as the time rate of change of pressure is negative with an increasing negative slope. At the point of inflection of downward slope of the pressure curve, the apparatus will record a maximum expected wind velocity VGMAX.

I have determined that $\delta P/\delta x$ in the geostrophic wind equation can be determined using a single pressure sensor by assuming that the wave cyclone propagates at an average velocity that can be approximated by a constant, e.g., 35 knots. Further, I have determined that once the time window (t) is selected, then the distance X can be substituted for $\delta X$. The time window (t) should be long enough to filter out transitory variations in pressure but still short enough to retain basic pressure trend information. I have determined empirically that the time window should be in the range of about 1½ to 3 hours, preferably about 2 hours.

In the preferred embodiment, the predetermined velocity is equal to 35 knots based on empirical observation. At 35 knots, over the empirically determined two hour period (t), the distance X traveled by the pressure surface is equal to 129,640 meters. Also, several of the above steps are repeated at regular intervals, e.g., every five minutes, to update the geostrophic wind velocity at the regular intervals. The sampling rate can be varied but shorter intervals require more memory and are unnecessary and the sampling should not exceed about 10 minutes because it causes unnecessary delay in updating the forecast wind velocities when pressure is changing quickly.

An apparatus for forecasting geostrophic wind velocity at a given location associated with a pressure surface is also described herein. The apparatus, according to the invention, includes a pressure sensor for detecting atmospheric pressure at the given location. The apparatus also includes a display for displaying the geostrophic wind as well as the prevalent atmospheric pressure. A controller means is coupled to the pressure sensor for receiving the detected atmospheric pressure. The controller is also operatively coupled to the display. Means for determining an atmospheric density (D) and an Coriolis parameter (F) are also included in the apparatus. Further, the apparatus, according to the invention, includes means for determining a geostrophic wind velocity (VG) responsive to said detected atmospheric pressure according to the following relationship:

$$VG = [1/(D \times F)] \times [\Delta P/X],$$

wherein ΔP corresponds to a change in pressure over the predetermined period of time (t) corresponding to the time required for said pressure surface to travel the distance (X) at a predetermined velocity. In the preferred embodiment, the determining means are implemented in software executed by a microcontroller in the controller means.

An advantage of the invention is that the apparatus operates in conjunction with conventional barometers.

Another advantage of the invention is that the method is not computationally intensive and, therefore, does not require sophisticated arithmetic circuitry.

A further advantage of the invention is that a minimum amount of memory is required to implement the method because the method does not require historical data.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 5 is a block diagram schematic of a geostrophic wind forecasting apparatus according to the invention.

DETAILED DESCRIPTION

Figure 1:
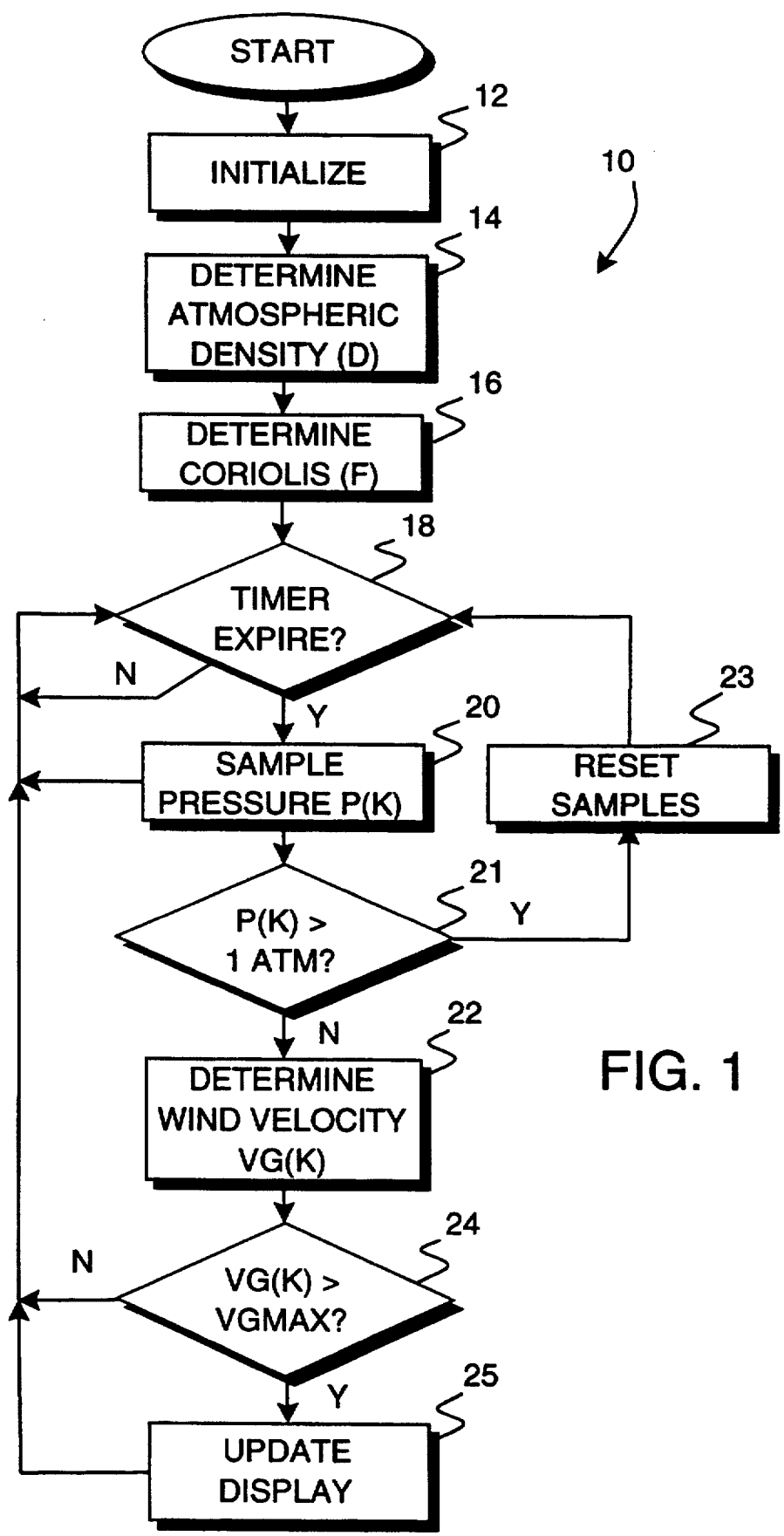
FIG. 1 is a top-level flow chart of the geostrophic wind forecasting method according to the invention.

Referring now to FIG. 1, a top level flow chart of a method of determining geostrophic wind velocity is shown generally at 10. The method will first be described with reference to FIGS. 1–4, and then an apparatus capable of executing the method will be described hereinafter with reference to FIG. 5.

The method hereinafter described determines geostrophic wind velocity as an approximation of peak earth surface wind velocity associated with wave cyclones. Although the geostrophic wind equation is not influenced by friction, which is present at the earth's surface, during peak wind conditions the geostrophic wind equation provides an accurate approximation of the worst case peak wind velocity at the earth's surface. Since most damage inflicted during wave cyclones is done during these peak wind conditions, the method forecasts the absolute worst case peak wind velocity by using a derivative of the geostrophic wind equation.

A top-level flowchart of a method of determining geostrophic wind velocity according to the invention is shown in FIG. 1. The flowchart shown in FIG. 1 begins with an initialization step 12. The initialization step 12 prompts a user for initialization information, e.g., latitude and temperature, and stores these inputs for future reference. The initialization step is described in further detail hereinafter with reference to FIG. 2.

At the completion of the initialization step 12, step 14 is executed wherein an atmospheric density D is determined. The atmospheric density D is computed according to formula 2 above. The pressure P and the temperature T required by equation 2 are, in the preferred embodiment, input by the user during the initialization step 12, as described further below. Step 14 computes the atmospheric density D and thereafter stores the resulting value for subsequent retrieval during the determination of the geostrophic wind velocity.

In step 16, the method determines a Coriolis parameter F. The Coriolis parameter is known in the art of meteorology as a function of latitude. The relationship between latitude and the Coriolis parameter is given by equation 3 above. In the preferred embodiment, the latitude is input by the user in the initialization step 12. Normally, the latitude is input in degrees and then converted into radians for calculation of the Coriolis parameter.

In step 18, the method waits for a timer to expire. If the timer has not expired, step 18 loops back upon itself. If the timer has expired, step 18 transitions to step 20 and a new pressure sample P(K) is taken. In the preferred embodiment, the timer is set for a period of approximately 5 minutes, although the period can range from 1-10 minutes without compromising the accuracy of the wind determination.

The current atmospheric pressure P(K) is then compared to a predetermined pressure in step 21. The predetermined pressure level is selected to correspond to a pressure above which anti-cyclonic winds occur. In the preferred embodiment, the predetermined pressure level is approximately equal to one standard Earth atmospheric pressure, i.e., 1013.25 millibars.

If the current atmospheric pressure P(K) is below the predetermined level, the method determines the geostrophic wind velocity VG(K) in step 22. The geostrophic wind velocity determination is described further below with reference to FIG. 3.

If the current atmospheric pressure P(K) is above the predetermined level, the method resets all accumulated pressure samples in step 23. The method, therefore, does not forecast the geostrophic wind velocity when the pressure is above the predetermined level. The invention forecasts wind velocity associated only with wave cyclones where the pressure is assumed to be below the predetermined level. Because the invention does not determine the geostrophic wind velocity while the pressure is above the predetermined level, which can be an extended period of time, the method can optionally prompt the user to reenter the current temperature once the pressure falls below the predetermined level. Prompting the user for the temperature allows the atmospheric density D to be recomputed following an extended period of high pressure.

After the geostrophic wind velocity VG(K) is determined in step 22, the velocity VG(K) is compared to a previously computed maximum geostrophic wind velocity VGMAX in step 24. If the current geostrophic wind velocity VG(K) is greater than VGMAX, the method sets VGMAX equal to VG(K) and updates a display in step 25 with the new value of VGMAX. If the VG(K) is less than VGMAX, however, step 24 transitions back to step 18, without updating the display, to await the expiration of the timer. Thus, steps 24 and 25 cooperate to display only increasing geostrophic wind velocities.

The method also includes the ability to reset the maximum geostrophic wind velocity VGMAX if VGMAX is not updated within a predetermined number of iterations of the loop, i.e., after a predetermined period of time. Resetting the maximum geostrophic wind velocity VGMAX avoids displaying old geostrophic wind velocity.

The method thereafter operates in a continuous loop, selectively executing steps 18 through 25. The method does, however, allow a user to terminate the loop in order to reinitialize the method. The reinitialization path is not shown for sake of simplicity. The reinitialization step can be invoked from a user input, thereby causing an interrupt, or can be invoked programmatically after a predetermined period of time.

Optionally, the atmospheric temperature can be detected and the atmospheric density recomputed prior to determining the geostrophic wind velocity in step 22, not shown in FIG. 1. The geostrophic wind velocity, however, is not that sensitive to variations in the atmospheric density. Thus, recomputation of the atmospheric density D is not essential to retain the desired accuracy in the geostrophic wind velocity determination. However, additional accuracy is possible if an optional temperature sensor is included in the apparatus and the atmospheric density recomputed during each iteration of the loop shown in FIG. 1. Alternatively, the temperature could also be set to a constant expected temperature.

Figure 2:
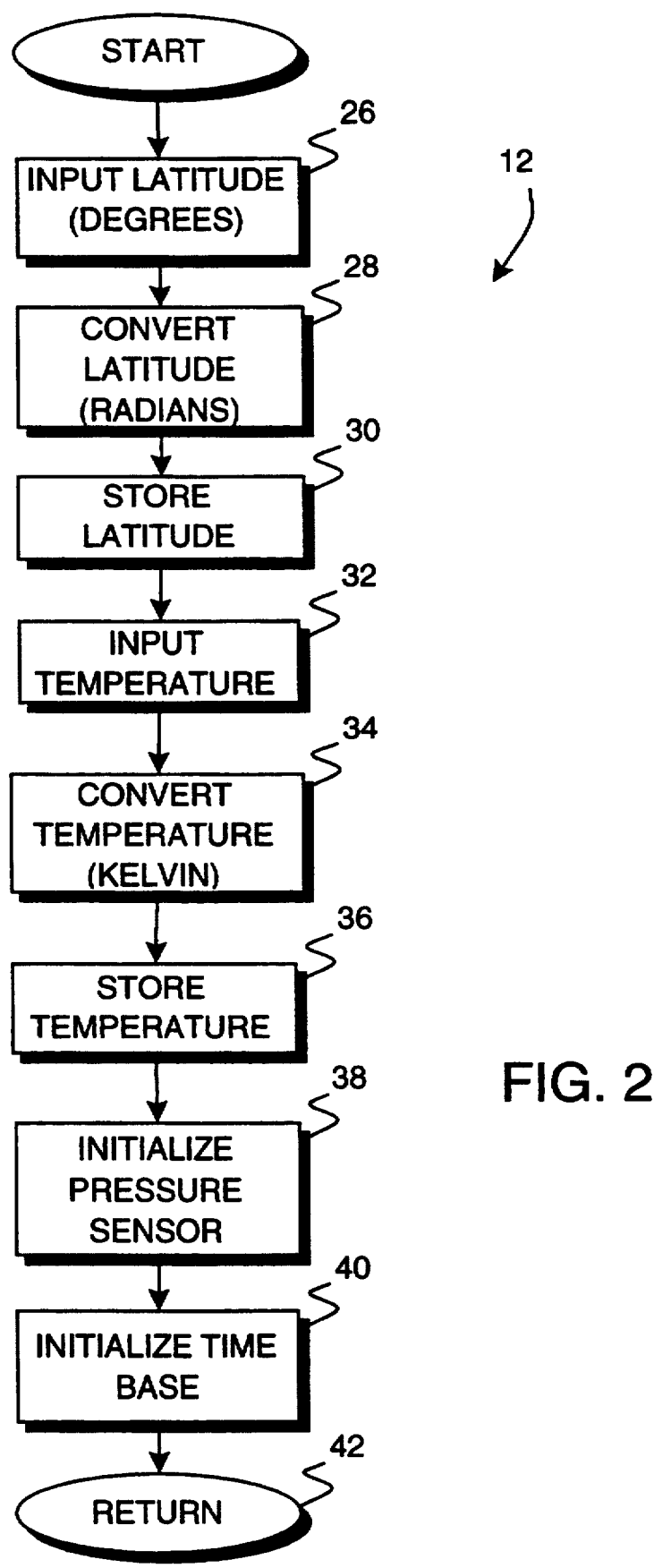
FIG. 2 is a flow chart of the initialization step of geostrophic wind forecasting method of FIG. 1.

Referring now to FIG. 2, the initialization step 12 is shown in detail. The initialization step 12 begins in step 26 wherein the latitude $\phi$ is input by the user in degrees. The initialization step 12 thereafter converts the latitude to radians in step 28. The latitude $\phi$ is then stored in step 30 for use in the Coriolis parameter determination of step 16.

In step 32, the prevalent temperature is input. The temperature can either be input manually by the user or read from a temperature sensor associated with the apparatus. The temperature input in step 32 is converted to degrees Kelvin in step 34. Thereafter, in step 36, the temperature is stored for subsequent use in the atmospheric density determination of step 14.

In step 38, a pressure sensor, by which the method detects the prevailing atmospheric pressure, is initialized. The pressure sensor, a barometer in the preferred embodiment, is initialized by the user to compensate for any change in pressure due to the vertical placement of the sensor relative to sea level. The pressure sensor is described further below with reference to FIG. 5.

The timer is initialized in step 40, which initializes the timer to a known time value. The timer is initialized in order to precisely synchronize the loop of FIG. 1. The initialization step 12 concludes in step 42 by returning to step 14 in FIG. 1.

Figure 3:
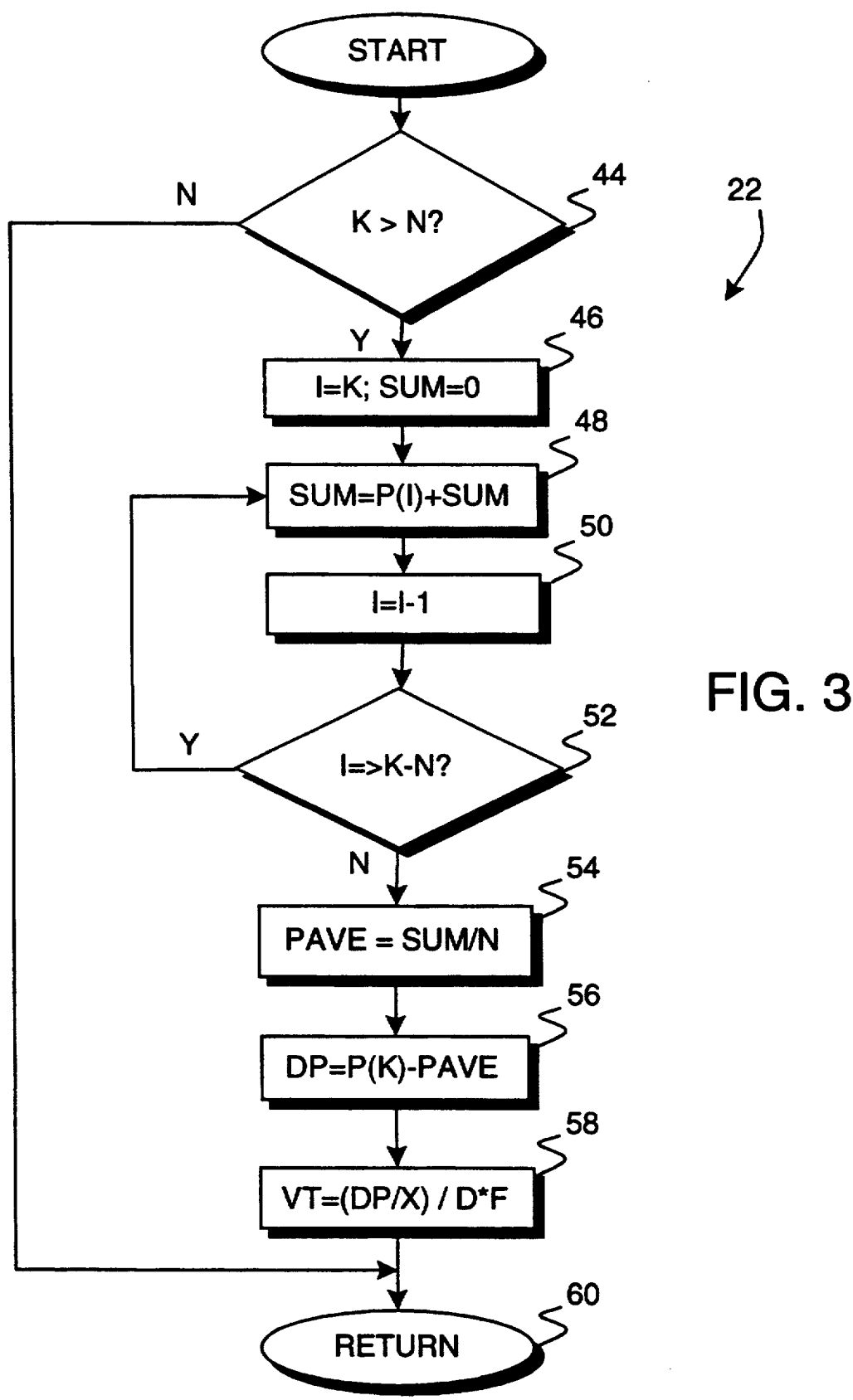
FIG. 3 is a flow chart of the geostrophic wind forecasting step of FIG. 1.

Referring now to FIG. 3, a detailed flow chart of the geostrophic wind velocity determination step 20 is shown. The embodiment shogun is merely one example of a myriad of alternative embodiments of implementing the underlying principle, as is apparent to one skilled in the art of computer software design. The embodiment shown in FIG. 3 is not meant to limit the invented method to the exact sequence of steps shown.

In the description that follows, the variable K refers to the current sample number. The sample numbers are incremented each time a new pressure sample is taken. Therefore, the current pressure sample is given as P(K). The variable N refers to the minimum number of samples necessary to execute the method shown in FIG. 3. In the preferred embodiment, N is equal to 24. Thus, for a timer period of 5 minutes, and a minimum number of samples of 24, the method requires a two hour lag time before the first results can be computed. The variable I is an internal variable used to control the sequence of an interloop of the method. The variable PAVE represents the average pressure over a period of N consecutive pressure samples.

The geostrophic wind velocity determination begins in step 44. In step 44, the current number of samples K is compared to the minimum number of samples N. If the current number of samples K is less than or equal to the minimum number of samples N, step 44 transitions to step 60 and the geostrophic wind velocity determination is terminated. If, however, the current number of samples K is greater than the minimum number of samples N, step 44 transitions to step 46 to begin the geostrophic wind determination.

Step 46 initializes the loop counter I equal to the current sample number K and sets the variable SUM equal to zero. The variable SUM is used to sum up the detected atmospheric pressure samples. Steps 48, 50 and 52 comprise an interloop in which the N most recent pressure samples are summed. In step 48, sum is incremented by the I pressure sample P(I). This implies that the pressure samples taken in step 18 of FIG. 1 are stored in a linear array or queue for retrieval during step 48. As will be apparent to one of ordinary skill in the art of computer science, however, the method hereinafter described requires only the N most recent pressure samples to be stored in memory. Thus, the underlying apparatus requires only a limited amount of memory in order to execute the invented method.

Empirical study has indicated that the average pressure PAVE should be computed over a minimum of two hours. If the time period over which the average is computed is less than two hours the resulting geostrophic wind velocity becomes erratic. In the preferred embodiment, a sample period of five minutes was chosen by on empirical study. Thus, twenty-four samples were necessary to span the two hour period. If, however, the sampling period were changed to one minute, for example, the minimum number of samples K would need to be increased accordingly, i.e., K=120.

In step 50, the loop counter I is decremented by 1. In step 52, the loop counter I is compared to the quantity K minus N. If I is greater than or equal to K minus N, then all of the N most recent pressure samples have not been summed, in which case step 52 transitions back to step 48 and the loop is repeated. If, however, I is less than K minus N, step 52 transitions to step 54 to calculate the average pressure PAVE.

In step 54, the average pressure PAVE is computed by dividing the variable SUM, which is now equal to the sum of the N most recent detected pressure samples, by the corresponding nun%her of pressure samples N. Thus, the average pressure PAVE is equal to the arithmetic mean of the N most recent detected pressure samples detected in step 18. It can be appreciated by those skilled in the art of computer science that steps 46–52 are but one method of computing the average pressure PAVE. The method shown in steps 46–52 is illustrative and not meant to limit the invention to the exact sequence of steps shown. Several other equivalent methods of computing an average could be used in place thereof, as is known in the art.

As mentioned above, the method requires only the last N detected pressure samples to be stored in memory. Each pressure sample P(K) detected in step 18 can be stored in a structure and stored in an N-deep queue. Thus, when a new pressure sample is detected, the oldest pressure sample can be removed from the queue, and the current pressure sample can be added to the queue. Methods of generating queues are well known in the art of computer science. If a queue is used, resetting the pressure samples in step 23 can be accomplished by setting the head and tail of the queue to a first element therein.

In step 56, the change in pressure DP is computed as the value of the current pressure sample P(K) minus the average pressure PAVE. The geostrophic wind velocity determination, therefore, does not simply use two pressure samples to determine a change in pressure. Rather, the change in pressure P is the current pressure P(K) minus the average pressure over the N most recent pressure samples. By using the average pressure PAVE, rather than an instantaneous pressure, the method smooths out many of the fluctuations caused by instantaneous and temporary fluctuations in atmospheric pressure.

The change in pressure DP is then used in step 58 to determine the geostrophic wind velocity VG according to the following equation:

$$VG = [1/(D \times F)] \times (DP/X) \qquad (4)$$

The variable X represents a distance that a pressure surface travels at a predetermined velocity over a period of time over which the N most recent pressure samples were taken.

The use of a constant distance X in the determination of the geostrophic wind velocity is based on empirical data showing that pressure surfaces propagate at a generally constant rate if measured over a sufficient period of time. Empirical evidence has shown that pressure surfaces associated with wave cyclones propagate at an average speed of between 30–40 knots. In the preferred embodiment, the pressure surface is assumed to propagate at approximately 35 knots.

The period of time (t) is a moving window over which the detected pressure is averaged. It should be sufficiently long to accurately determine the time rate of change of pressure. This means that time (t) needs to be long enough to filter out variations in mass and velocity divergence in the propagating wave cyclone. That is, it should be long enough to dampen variations in the pressure signal produced by mass and velocity divergence. Empirical evidence has shown that a period of between 2–3 hours is a necessary in order for the pressure surface to reliably demonstrate average propagation speed of about 35 knots. A shorter time period can be used, for example, 1½ hours, but the predicted wind velocities will begin to fluctuate widely. As time window (t) is shortened, for example, with (t) set at 1 hour, the system can predict excessively high winds for a short time and then excessively low wind velocity for a short time period. Using a longer time window averages out these spurious variations.

Conversely, it is unnecessary to have a very long time window, e.g., over three hours, because it does not significantly improve predictive accuracy. Moreover, if the storm center passes close to the observation site—so that the radii of curvature of isobars are relatively small—a very long window will over-dampen the detected pressure signal and mask out the strongest pressure gradients associated with the storm, thereby giving an erroneously low forecast wind velocity. In the preferred embodiment, the period to time (t) selected is to be approximately 2 hours. Assuming a pressure surface propagation of 35 knots and a time period of 2 hours, the pressure surface will have propagated approximately 129,640 meters, a so-called "millibar mile," which is the preferred value of distance X. The distance X is referred to as a millibar mile because this is the average distance an isobaric surface of a wave cyclone will propagate during the given 2 hour period.

The theoretical basis for the expression shown in step 58 can be illustrated by the following derivation. Beginning with an approximation to the geostrophic wave equation:

$$VG = [1/(D \times F)] \times (\Delta P/\Delta x) \quad (5)$$

Assuming the corresponding wave cyclone has a constant propagation velocity V over a predetermined period V is given by the following expression:

$$V = (\Delta x/\Delta t), \text{ or}$$

$$\Delta x = V \times \Delta t \quad (6)$$

Substituting (6) into (5) yields the following expression:

$$VG = [1/(D \times F)] \times [\Delta P/(V \times \Delta t)] \quad (7)$$

Thus, the geostrophic wind equation can be represented as a function of pressure, velocity, and time using the assumptions teachings herein.

Figure 4A:
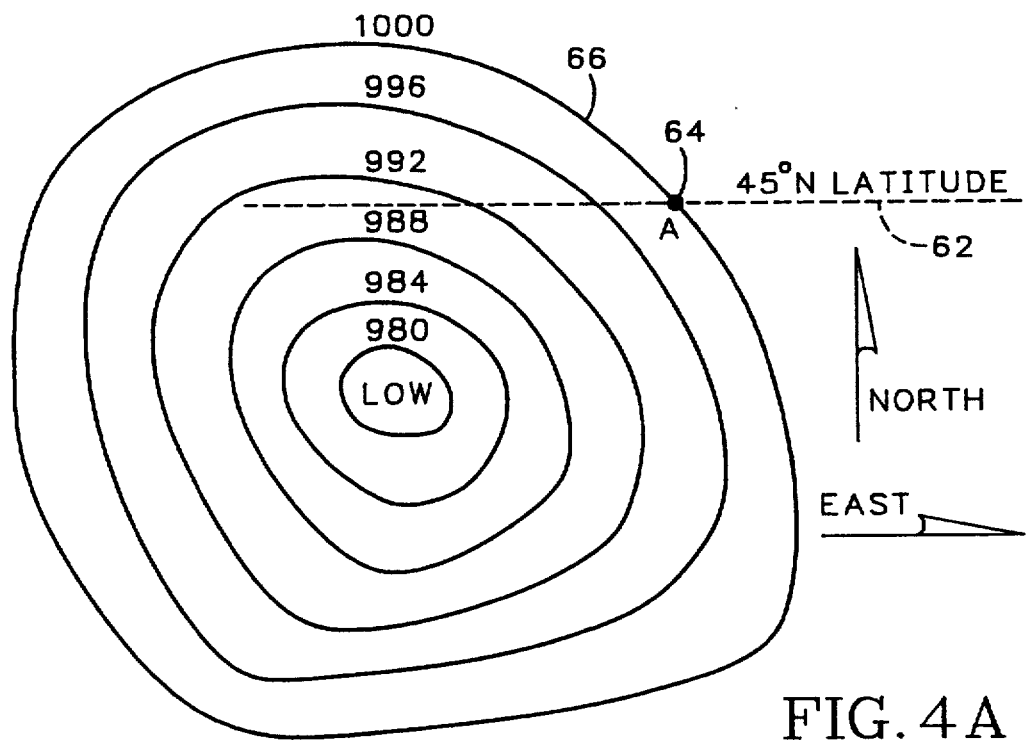
FIG. 4A is an two-dimensional illustration of a moving pressure surface having a plurality of concentric isobaric lines.
Figure 4B:
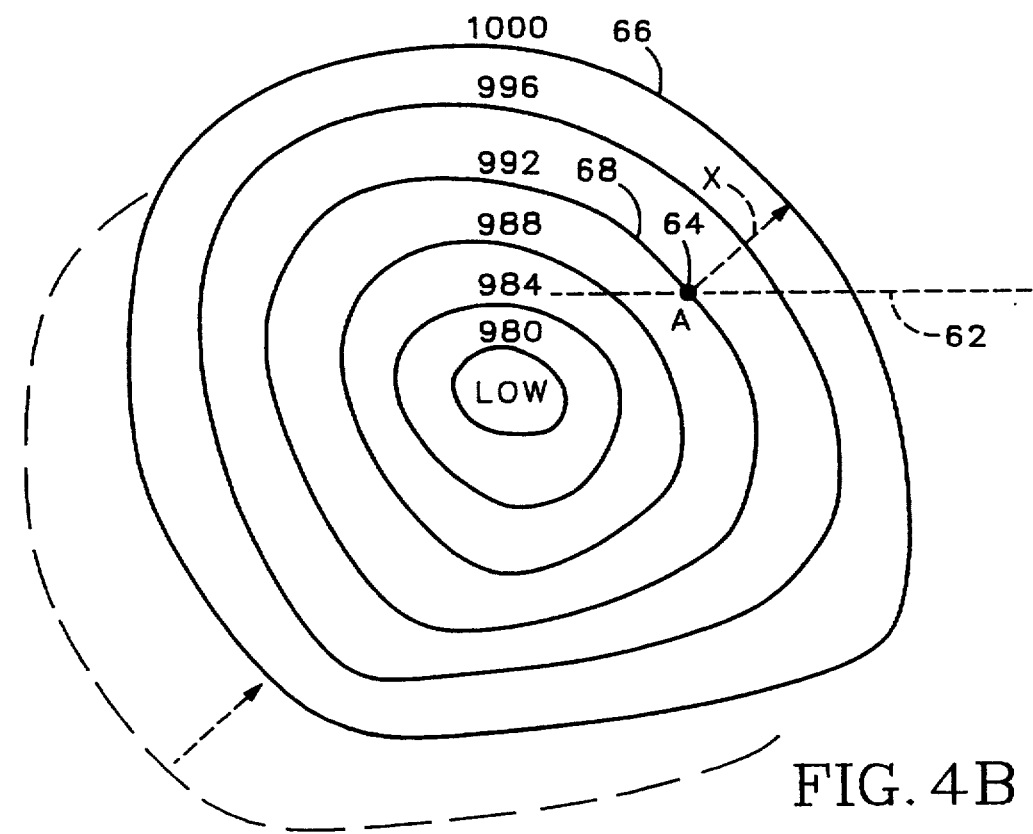
FIG. 4B is an two-dimensional illustration of the moving pressure surface of FIG. 5A having moved a given distance.

The behavior of aware cyclone can be more clearly seen with reference to FIGS. 4A and 4B. A two dimensional view of a pressure surface is shown propagating eastward in FIGS. 4A and 4B. In FIG. 4A, a pressure front comprising a plurality of concentric, isobaric lines is shown. Each isobaric line represents a constant pressure line, hence the name. A line of latitude 62, e.g., 45 degrees north, intersects an outermost isobaric line 66 at a point A shown generally at 64. The outermost isobaric line has a corresponding pressure shown equal to 1000 millibars. Each adjacent isobaric line is in increments of 4 millibars.

Referring now to FIG. 4B, the pressure surface of FIG. 4A is shown having propagated eastward over a predetermined period T, i.e., Δt. The predetermined period corresponds to the period during which the N pressure samples are taken, as described above. During the period T, assuming the pressure surface propagates at an average rate of 35 knots, it propagates an average distance equal to approximately 129,640 meters, i.e., a millibar mile. Thus, using the empirically based assumption of a constant velocity, the change in pressure versus distance used in the geostrophic wind velocity determination reduces to a change in pressure over a constant.

A preferred embodiment of P of an apparatus for geostrophic wind velocity determination is shown generally at 100 in FIG. 5. The geostrophic wind velocity apparatus 100 includes, in its most elementary form, a controller means 102, a pressure sensor 104, a keyboard 106, and a display 108. In addition, an optional temperature sensor 110, and an optional modem 112 can be included as described further below.

The controller means includes a microcontroller 114, a timer circuit 116, and a memory 118. The microcontroller can take many forms, including but not limited to a microprocessor, an embedded controller, or an application specific integrated circuit (ASIC).

The timer 116 is coupled to the microcontroller 114 via line 122. The timer 116 is designed to supply an interrupt to the microcontroller 114 at the expiration of the timer period. In the preferred embodiment, the timer is programmable such that the microcontroller can set the timer period programmatically. In which case, an additional bus is required between the microcontroller and the timer to transmit the desired timer period to the timer 116. Alternatively, the microcontroller can pull the timer to determine whether the timer period has expired rather than via an interrupt. In yet another embodiment, the timer can be embodied in a software loop, in which case no additional circuitry is required other than a simple oscillator to clock the microcontroller.

A memory 118 is coupled to microcontroller 114 via bus 120. The memory 118 is, in the preferred embodiment, both a read-only memory (ROM) and a random access memory (RAM); the ROM stores the program code and variable whereas the RAM is used for scratch pad and other temporary storage. Bus 120 is a bi-directional bus, allowing data to be both read from and written to the memory 118. The memory 118 may be formed on the same integrated circuit as the microcontroller 114. Many commercially available microcontrollers for embedding control applications have internal memory therein.

The geostrophic wind velocity apparatus 100 also includes a pressure sensor 104. The pressure sensor communicates to control means 102 via line 124. The pressure sensor in the preferred embodiment is made of a piezoelectric material. The piezoelectric material produces a voltage proportional to the atmospheric pressure. The voltage is then converted to a digital format and then transmitted to the control means over lines 124. In the preferred embodiment, the pressure sensor comprises a standard barometer.

A keyboard 106 is coupled to the control means via lines 130. The keyboard can be a conventional keyboard or can be any comparable user-input device which allows the user to input data and commands to the control means 102. The apparatus 100 also includes a display 108. The display is coupled to the control means via lines 132. In the preferred embodiment, display 108 is a liquid crystal display (LCD) having an intelligent LCD controller contained therein, although a light-emitting-diode (LED) display can also be used. The microcontroller sends packets of display data over lines 132 which are then displayed in a conventional manner on display 108. Alternatively, backlit displays or electroflorescent displays can be used.

The display means 108 can further include a visual and/or audio warning means to indicate when the geostrophic wind velocity exceeds a predetermined maximum value. The control means 102 in that case includes means for comparing the geostrophic wind velocity to the predetermined maximum value. If the geostrophic wind velocity exceeds a predetermined maximum value, the control means 102 transmits a command to the display 108 to actuate the visual warning means. In addition, if the modem 112 is used, a warning message can be sent by the controller means 102 to the modem to notify additional sites of the impending winds.

An optional temperature sensor 110 can be included in the apparatus 100. The temperature sensor, if included, is coupled to the control means 102 via lines 126. The temperature sensor is a standard thermometer type sensor capable of producing a digital representation of the atmospheric temperature. The digital temperature data is then communicated to the control means 102 via lines 126. If the temperature sensor is included, the method shown in FIG. 1 can recompute the atmospheric density at regular intervals, e.g., every five minutes without requiring user input. This allows the geostrophic wind velocity determination to incorporate the updated atmospheric density.

A yet further optional element of the geostrophic wind velocity apparatus 100 is modem 112. Modem 112 is coupled to the control means 102 via lines 128. The modem allows the apparatus 100 to send and receive meteorological data to and from meteorological services. The modem would allow the apparatus 100 to receive additional meteorological information which could thereafter be displayed on display 108. Alternatively, the modem could be replaced with a serial channel to allow the apparatus to communicate with a printer or other peripheral.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method of forecasting geostrophic wind velocity at a given location resulting from a moving pressure surface implemented in a commuter-based instrument which includes a microcontroller, a display, a timer, a pressure sensor for detecting and outputting atmospheric pressure samples to the microcontroller, and a memory for storing pressure sample data, the method comprising:

determining an atmospheric density (D) at said location;

determining a Coriolis parameter (F) at said location;

detecting a plurality of atmospheric pressure samples at said location over a predetermined period of time (t) corresponding to the time required for said pressure surface to travel a distance (X) at a predetermined velocity;

determining from the plurality of atmospheric pressure samples, a chance of pressure $\Delta P$ over said predetermined period;

determining a geostrophic wind velocity (VG) according to the following relationship:

$$VG = (1/(D \times F)) \times (\Delta P/X);$$

and displaying an expected maximum wind speed based on said geostrophic wind velocity (VG).

2. A method according to claim 1 wherein detecting atmospheric pressure samples at said location comprises detecting said atmospheric pressure samples a plurality of times over a predetermined period of time (t) corresponding to the time required for said pressure surface to travel a distance (x) at a predetermined velocity of approximately 35 knots.

3. A method according to claim 1 wherein detecting atmospheric pressure samples at said location comprises detecting said atmospheric pressure samples a plurality of times over a period (t) of approximately two hours corresponding to the time required for said pressure surface to travel a distance (X) at a predetermined velocity.

4. A method according to claim 1 wherein detecting atmospheric pressure samples at said location comprises detecting said atmospheric pressure samples a plurality of times over a period (t) of about 1½ to 3 hours corresponding to the time required for said pressure surface to travel a distance (X) at a predetermined velocity of about 30–40 knots.

5. A method according to claim 1 wherein detecting atmospheric pressure samples at said location comprises detecting said atmospheric pressure samples at regular intervals over a period (t) corresponding to the time required for said pressure surface to travel a distance (X) at a predetermined velocity and time-averaging the pressure samples to filter out short duration variations in detected pressures.

6. A method according to claim 5 wherein detecting atmospheric pressure samples at said location comprises detecting said atmospheric pressure samples at approximately five minute intervals over a period (t).

7. A method according to claim 5 wherein time-averaging the pressure samples includes determining an average atmospheric pressure over said predetermined period including:

summing said detected atmospheric pressure samples; and dividing said sum by the number of said detected atmospheric pressure samples.

8. A method according to claim 1 wherein determining an atmospheric density (D) at said location comprises:

determining a current temperature (T) at said location; and determining said atmospheric density responsive to said current temperature.

9. A method according to claim 8 wherein determining a current temperature (T) at said location comprises:

prompting a user to input said current temperature; and supplying said current temperature responsive to said prompt.

10. A method according to claim 8 wherein the instrument includes a temperature sensor and determining a current temperature (T) at said location comprises:

detecting said current temperature; and inputting said detected temperature to the microcontroller.

11. A method according to claim 1 wherein determining a Coriolis parameter (F) at said location comprises:

determining a latitude of said location; and determining said Coriolis parameter (F) responsive to said latitude.

12. A method according to claim 11 wherein determining a Coriolis parameter (F) at said location comprises:

prompting a user to input said latitude; and supplying said latitude responsive to said prompt.

13. A method of forecasting geostrophic wind velocity at a single location resulting from a moving pressure surface, implemented in an instrument which includes a pressure sensor for detecting atmospheric pressure, a transformation circuitry, a timer, and a display for displaying wind velocity, the method comprising:

inputting a temperature into the transformation circuitry and determining an atmospheric density (D) at said location;

inputting a latitude into the transformation circuitry and determining a Coriolis parameter (F) at said location;

detecting an atmospheric pressure at said location over a predetermined period of time (t) corresponding to the time required for said pressure surface to travel a distance (X) at a predetermined velocity;

transmitting the detected atmospheric pressure into the microcomputer:

determining a negative change in pressure ($\Delta P$) at said location over said period of time (t);

transforming the change in pressure (ΔP) over time (t) into a geostrophic wind velocity (VG) according to the following relationship:

$$VG = (1/(D \times F)) \times (\Delta P/X);$$

and displaying an expected maximum wind velocity for said location based on said geostrophic wind velocity (VG).

14. A method according to claim 13 wherein determining a negative change in pressure (ΔP) over said period of time (t) comprises:
   detecting an atmospheric pressure at said location a plurality of times over a predetermined period of time (t) corresponding to the time required for said pressure surface to travel a distance (X) at a predetermined velocity;
   determining an average negative change in pressure (ΔP) over said predetermined period; and
   basing the expected maximum wind velocity on a maximum value of geostrophic wind velocity (VG) determined during said predetermined period of time (t).

15. A method according to claim 13 wherein detecting an atmospheric pressure at said location comprises detecting said atmospheric pressure a plurality of times over a predetermined period of time (t) corresponding to the time required for said pressure surface to travel a distance (X) at a predetermined velocity of approximately 35 knots.

16. A method according to claim 15 wherein detecting an atmospheric pressure at said location comprises detecting said atmospheric pressure a plurality of times over a period (t) of approximately two hours corresponding to the time required for said pressure surface to travel a distance (X) of approximately 129,640 meters, measured normal to an isobaric line at said location, at said predetermined velocity.

17. A method according to claim 13 further comprising:
   detecting a current atmospheric pressure (P(K)) at said location; and
   displaying said current atmospheric pressure (P(K)).

18. A method according to claim 16 further comprising repeating the following steps at regular intervals:
   detecting an atmospheric pressure at said location over a predetermined period of time (t) corresponding to the time required for said pressure surface to travel a distance (X) at a predetermined velocity;
   determining a change in pressure (ΔP) over said period of time (t);
   determining the geostrophic wind velocity (VG) for each change in pressure (ΔP); and
   updating the expected maximum wind velocity based on a maximum value of geostrophic wind velocity (VG) determined during said predetermined period of time (t).

19. A method according to claim 18 wherein said repeated steps are repeated responsive to a timer expiration.

20. A method according to claim 15 wherein the displaying step comprises displaying said maximum expected wind velocity when the geostrophic wind velocity (VG) exceeds a previously-determined geostrophic wind velocity.

21. An apparatus for forecasting geostrophic wind velocity at a given location associated with a pressure surface comprising:
   a pressure sensor for detecting atmospheric pressure at said location;
   a display;
   controller means coupled to said pressure sensor for receiving said detected atmospheric pressure, said controller operatively coupled to said display;
   means for determining an atmospheric density (D) at said location;
   means for determining an Coriolis parameter (F) at said location;
   means for determining an expected geostrophic wind velocity (VG) responsive to said detected atmospheric pressure according to the following relationship:

$$VG = (1/(D \times F)) \times (\Delta P/X)$$

wherein ΔP corresponds to a negative change in pressure over a predetermined period of time (t) corresponding to the time required for said pressure surface to travel a distance (X) at a predetermined velocity.

22. An apparatus for forecasting geostrophic wind velocity according to claim 21 further comprising means for notifying a user when said geostrophic velocity exceeds a predetermined velocity.

23. An apparatus for forecasting geostrophic wind velocity according to claim 21 further comprising means for displaying said current atmospheric pressure (P(K)).

24. An apparatus for forecasting geostrophic wind velocity according to claim 21 further comprising means for resetting said detected pressure samples when a current detected pressure exceeds a predetermined pressure level.

25. An apparatus for forecasting geostrophic wind velocity according to claim 24 wherein said pressure sensor comprises a barometer.

26. An apparatus for forecasting geostrophic wind velocity according to claim 24 wherein said controller means comprises:
   a microcontroller;
   a clock operatively coupled to said microcontroller; and
   memory means operatively coupled to said microcontroller.

27. An apparatus for forecasting geostrophic wind velocity according to claim 24 further comprising means for inputting user data and commands into said controller means.

28. An apparatus for forecasting geostrophic wind velocity according to claim 27 wherein means for inputting user data and commands into said controller means comprises a keyboard.

29. An apparatus for forecasting geostrophic wind velocity according to claim 24 further comprising a temperature sensor operatively coupled to said controller means for supplying atmospheric temperature signals thereto.

30. An apparatus for forecasting geostrophic wind velocity according to claim 24 further comprising a modem operatively coupled to said controller means for supplying data thereto.

31. An apparatus for forecasting geostrophic wind velocity according to claim 24 further comprising a timer operatively coupled to said controller means, said controller means being responsive to sample said pressure sensor responsive to said timer.

* * * * *